May 24, 1966 J. A. KILFOYLE 3,252,226

PROCESS FOR COOLING AND STORING RUBBER PELLETS

Filed May 10, 1962 2 Sheets-Sheet 1

Fig. 1.

INVENTOR.
John A. Kilfoyle
BY William Turner
Atty.

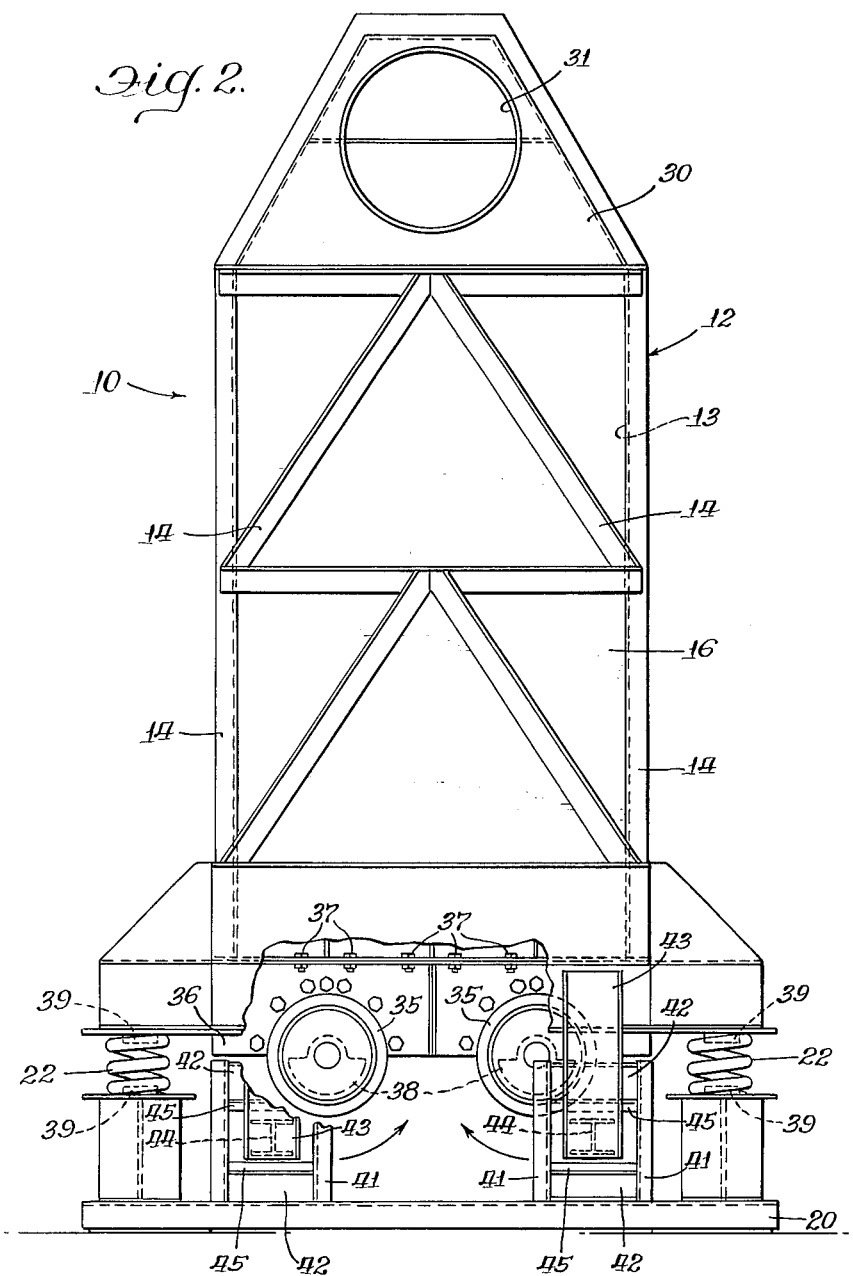

United States Patent Office 3,252,226
Patented May 24, 1966

3,252,226
PROCESS FOR COOLING AND STORING
RUBBER PELLETS
John A. Kilfoyle, South Holland, Ill., assignor to
Link-Belt Company, a corporation of Illinois
Filed May 10, 1962, Ser. No. 193,834
6 Claims. (Cl. 34—20)

This invention relates in general to the manufacture of rubber products and more particularly a method and apparatus for handling pelletized rubber in order to prevent coalescence of the particles.

In the manufacture of rubber and rubber products it is the usual practice to provide a batch of natural crude rubber or synthetic rubber together with the various powders, oils and resins utilized in the manufacture of the desired rubber end product. These materials are placed into a Banbury mixer or similar apparatus utilized in the mixing of rubber. The materials are cold mixed for a predetermined time; and, due to the extreme pressures within the mixer, the temperature of the rubber is raised to approximately 250° to 350° F., depending upon the materials present in the batch and the time required to mix it. The material as discharged from the mixer is usually in the form of a master batch, which means that it may be remixed with other materials before the eventual completion of the desired end product. In such instances, the master batch is reintroduced to the mixer and a further mixing is performed.

In order to render the rubber product easier to convey, elevate and weigh, it is discharged as pellets from the mixer; or is pelletized after discharge. During the process individual relatively small pellets tend to coalesce when stored in close proximity at relatively high temperatures. It will be understood that this coalescence occurs whether the product is being cooled or dried and therefore the present invention is applicable to either treatment, depending upon the temperature of the air stream present in the apparatus described.

It is a primary object of the present invention to provide a new and improved method and apparatus for handling pelletized rubber to prevent coalescence of the pellets.

Still another object of this invention is to provide a new and improved method and apparatus for handling rubber pellets wherein the pellets are agitated and simultaneously subjected to a conditioning air stream.

A further object of this invention is to provide a new and improved apparatus for agitating rubber pellets to prevent coalescence thereof while the pellets are cooling or drying.

Another object of this invention is to provide a method and apparatus for handling rubber pellets wherein the amount of air and power required to fluidize the pellets in a conditioning air stream is substantially reduced.

Other objects and advantages of the invention will be apparent during the course of the following description.

In the accompanying drawings forming a part of this specification, and in which like reference characters are employed to designate like parts throughout the same:

FIGURE 1 is a side elevational view, partly broken away, of a vibrating bin constructed in accordance with the present invention; and FIGURE 2 is an end elevational view, partly broken away, of the apparatus shown in FIG. 1.

Referring now particularly to FIG. 1 the vibratory cooler of the present invention is indicated generally by the reference numeral 10 and comprises a housing portion 12 that is rectangular in plan and provides a chamber 13 therein. The housing 12 is formed of a plurality of structural members 14 having plates 16 mounted thereon to form the end and side walls of the housing. The bottom portion 18 of the housing 12 is open to allow admission of air into the housing 12. The structural members 14 and the plates 16 are joined to each other by suitable means such as welding or the like.

The housing 12 is supported upon a base portion 20 by coil spring members 22 located at each corner of the housing. It will be understood that the mounting of the storage bin 12 upon the base 20 may be by any suitable resilient means. The apparatus 12 is supported in the manner disclosed in order to allow the housing 12 to vibrate in a vertical direction. By vibrating the assembly 12 in a vertical plane, the pressure requirements to circulate air through the material passing through the chamber 13 are considerably reduced as will be later described.

As illustrated in FIG. 1, a plurality of shelves 24 are mounted within the chamber 13. The shelves 24 are alternately oppositely inclined longitudinally of the housing 12 to provide a multilevel bed for material passing through the cooler. Each shelf 24 is mounted within the chamber 13 so that its lower end is spaced from the adjacent end wall of the housing 12. The upper end is positioned closely adjacent the opposite end wall of the housing 12 and the shelf 24 is clamped in position by selectively positioned fasteners 26. The positions of the fasteners 26 may be varied so that the shelves 24 are supported at different selected angles of inclination within the housing 12. The fasteners 26 extend through suitably spaced openings 27 formed in the structural members 14 of the housing 12 and through mounting slots 28 in opposite sides of the shelves 24 to support the shelves 24 at three longitudinally spaced locations as shown in FIG. 1. The downhill slope of the shelves 24 may be adjusted to control the rate of cascading movement of the material passing through the chamber 13. The spaced holes 27 are formed in the structural members 14 so that either or both ends of the shelves 24 may be repositioned to provide the desired inclination. The shelves 24 have openings or perforations formed therein (not shown). It will be understood that the shelves 24 may be screens or like structures wherein cooling or drying air passes through the shelves in either direction.

A suction fan (not shown) is connected to the hood 30 on the top of the housing 12 by the conduit 31 and draws air through the open bottom of the housing 12 and upwardly through the shelves 24 to cool or dry the material passing in downward cascading sequence upon the shelves. The connection between the hood 30 and conduit 31 includes a suitable flexible section 32.

The material which is to be cooled or dried is fed into the top of the housing 12 by means of a suitable hopper 33 which is mounted upon the hood 30. The material which is fed to the top shelf 24 spreads out to seek its own level due to vibration of the shelves. The material then moves downwardly in cascading sequence from one shelf 24 to the next and, due to the positioning of the shelves within the housing 12, a material seal is effectively formed by cascading material between the lower end portion 34 of each shelf and the inner walls of the housing 12.

It is frequently desired to treat rubber pellets or like resilient material in the described apparatus. As resilient pellets are deposited into the chamber 13 through the hopper 33 upon the top shelf 24 there is a tendency for some of the pellets to bounce angularly upwardly from the shelf. A curtain (not shown) may be suspended from the inner wall of the upper portion of the housing 12 at a predetermined position to act as a blocking wall against which the pellets may propel to fall downwardly upon the shelf 24.

When the material reaches the bottom edge of the housing 12 it is discharged through a gate 48 which is pivotally mounted upon the housing 12 adjacent the lower end of the bottom shelf 24 to operably open and close a discharge port located at the lower portion of the housing 12. The gate 48 moves upwardly and downwardly to open and close the discharge port in response to an arm 47 which pivotally connected at one end to the gate 48 and at its other end to a cylinder 46, which operates in the known manner. The gate 48 may be closed when it is desired to store pellets within the chamber 13.

A second gate 51 is pivotally mounted within the housing 12 at approximately the center thereof. The gate 51 is pivotally fixed to one end of an arm 50. The other end of the arm 50 is pivotally mounted upon the center cylinder 49. The gate 51 is lowered to block the flow of cascading pellets through the chamber 13 when it is desired to pass a new batch or a different material through the apparatus. In this manner it is assured that all of the previous batch has passed from the chamber 13 through the gate 48 before any of the new batch passes the gate 51.

The vibrating means of the present invention comprises a pair of independently operative motors 35 (FIG. 2) mounted on brackets 36 at the bottom of the housing 12. The brackets 36 extend laterally across the housing 12 and are fixed to the structural members 14 at the bottom of the housing by fasteners 37. Each motor 35 has a pair of counterweights 38 mounted on opposite ends of its shaft and the two motors are connected for rotation in opposite directions. The motors 35 will automatically synchronize when set into operation so that the horizontal components of force produced by the rotation of the eccentrically loaded motors cancel each other and the vertical forces produced by the motors will produce vertical vibration of the housing 12 upon the springs 22. It will be understood that the apparatus 12 may be vibrated in any predetermined direction depending upon the relative positions of the counterweighted motor shafts with respect to the housing 12.

The counterweights 38 are selected to provide a force which will cause the housing 12 to vibrate under normal operation at a stroke that is sufficiently small to avoid any tendency for the housing to tilt or be displaced from its position on the springs 22. In order to prevent any movement of the springs 22 on the base 20 or the housing 12 on the springs, spring guides 39 are mounted to extend into the opposite ends of the spring coils.

During the period when the motors 35 are accelerating to their normal operating speeds as the device is set into operation and during the period of deceleration when the motors are turned off, the speed of rotation of the counterweights 38 passes through the critical or resonant frequency corresponding to that of the spring mass system provided by the housing 12 and its associated components and the springs 22. When the speed of the motors 35 coincides with the resonant frequency, the magnitude of the vibrations is amplified. To prevent tipping or displacement of the housing 12 during this period of amplified vibrations; snubbers are provided at each corner of the housing to limit the extent of vibratory movement thereof. As illustrated in FIG. 2, each snubber is formed with a pair of vertical posts 41 which are rigidly connected to the base 20. A pair of transverse members 42 extend between and are secured to the posts 41 in vertically spaced relationship. A pair of vertically arranged columns 43 extend downwardly from the housing 12 on opposite sides of the members 42 and a beam 44 extends between the columns 43 through the space between the transverse members 42. Sufficient clearance is provided between the top and bottom of the beam 44 and the adjacent members 42 to prevent engagement therebetween during normal operation of the cooler. When the amplitude of the vibrations becomes excessive, however, the beam 44 will engage pads 45 on the transverse members 42 and the amplitude of the vibrations will thereby be limited.

Material is fed to the supply hopper 33 by a suitable feeding device or conveyor (not shown). The material enters the chamber 13 from the hopper 33 onto the uppermost shelf 24 and from there passes in cascading sequence to the various lower shelves and proceeds to the lowermost portion of the chamber where it is discharged through the gate 48 of the chamber 13. It will be readily appreciated that the material may be stored in the chamber 13 by reducing the angle of inclination of the shelves 24 and by restricting the flow of material from the lower end of the lowermost shelf by closing the gate 48.

There is provided therefor, a new and improved vibrating cooler or dryer adapted to condition rubber pellets by passing the pellets through a vibrating bin having a plurality of inclined shelves through which a conditioned air stream flows. The vibration of the pellets prevents coalescence thereof during said conditioning and any subsequent period of storage.

I have illustrated and described what I consider to be the preferred embodiment of my invention. It will be understood, however, that various alterations and modifications may be made without departing from the spirit of the invention and the scope of the subjoined claims.

Having thus described the invention, what I claim is:

1. A method of cooling pelletized rubber comprising: forming a bed of said pellets by dispersing the same over a substantial area at a minimal depth, mechanically vibrating said bed in a substantially vertical direction to prevent coalescence of said pellets by maintaining the bed in a continuously agitated state and to separate said pellets for facilitating the flow of air therethrough, maintaining the pellets in said bed until sufficiently cooled to prevent coalescence thereof when stored in depth, and discharging said pellets from said bed after the temperature of the pellets has been reduced to a value at which the pellets will not coalesce in storage.

2. A method of cooling pelletized rubber comprising: forming a bed of said pellets by dispersing the same over a substantial area at a minimal depth, mechanically vibrating said bed in a substantially vertical direction to prevent coalescence of said pellets by maintaining the bed in a continuously agitated state and to separate said pellets for facilitating the flow of air therethrough, maintaining the pellets in said bed until sufficiently cooled to prevent coalescence thereof when stored in depth, passing a confined stream of air through said bed to accelerate the cooling of the pellets, and discharging said pellets from the bed after the temperature of the pellets has been reduced to a value at which the pellets will not coalesce in storage.

3. A method of cooling pelletized rubber comprising: forming an inclined bed of said pellets by dispersing the same over a substantial area at a minimal depth, mechanically vibrating said bed in a substantially vertical direction to prevent coalescence of said pellets by maintaining the bed in a continuously agitated state and to separate said pellets for facilitating the flow of air therethrough, said vibrating effecting movement of the pellets along the inclined bed toward the lower edge thereof, maintaining the pellets in said bed until sufficiently cooled to prevent coalescence thereof when stored in depth, passing a confined stream of air through said bed to cool the pellets during the movement thereof along the bed, discharging the cooled pellets from the lower edge of the bed, and introducing hot pellets to the upper edge of the bed at substantially the same rate at which said cooled pellets are discharged.

4. A method of cooling pelletized rubber comprising: forming a plurality of inclined beds of said pellets with the pellets of each bed dispersed over a substantial area at a minimal depth and with the beds arranged in superimposed relationship with the upper edge of each bed positioned beneath and adjacent to the lower edge of the next higher bed, mechanically vibrating said beds in a substantially vertical direction to prevent coalescence of said pellets by maintaining the beds in a continuously agitated state and to separate said pellets for facilitating the flow of air therethrough, said vibrating effecting movement of said pellets along the inclined beds toward the lower edges thereof, passing a confined stream of air through said beds to cool the pellets during the movement thereof along the beds, discharging the cooled pellets from the lower edge of each bed into the upper edge portion of the next lower bed and finally discharging the pellets from the lower edge of the lower most bed at a temperature at which the pellets will not coalesce when stored in depth, and introducing hot pellets to the upper edge portion of the uppermost bed at substantially the same rate at which cooled pellets are discharged from the lower edge of the lowermost bed.

5. A method of cooling pelletized rubber comprising: forming an inclined bed of said pellets by dispersing the same over a substantial area at a minimal depth, mechanically vibrating said bed in a straight-line vertical manner to prevent coalescence of said pellets by maintaining the bed in a continuously agitated state and to separate said pellets for facilitating the flow of air therethrough, said vibrating effecting movement of said pellets along the inclined bed toward the lower edge thereof, maintaining the pellets in said bed until sufficiently cooled to prevent coalescence thereof when stored in depth, passing a confined stream of air through said bed to cool the pellets during the movement thereof along the bed, discharging the cooled pellets from the lower edge of the bed and introducing hot pellets to the upper edge of the bed at substantially the same rate at which said cooled pellets are discharged.

6. A method of cooling pelletized rubber comprising: forming a plurality of inclined beds of said pellets by dispersing the pellets of each bed over a substantial area at a minimal depth, the beds being arranged in superimposed relationship with the upper edge of each bed positioned beneath and adjacent to the lower edge of the next higher bed, simultaneously mechanically vibrating all of said beds in straight-line vertical direction to prevent coalescence of said pellets by maintaining the beds in a continuously agitated state and to separate said pellets for facilitating the flow of air therethrough, said vibrating effecting movement of said pellets along the inclined beds toward the lower edges thereof, passing a confined stream of air successively through the lowermost and each of the next higher beds to cool the pellets during the movement thereof along the beds, discharging the cooled pellets from the lower edge of each bed into the upper edge portion of the next lower bed, selectively regulating the movement of pellets along the beds to maintain the pellets in an agitated state for a sufficient period to prevent coalescence thereof when stored in depth and introducing hot pellets to the upper edge portion of the uppermost bed at substantially the same rate at which cooled pellets are discharged from the lower edge of the lowermost bed.

References Cited by the Examiner

UNITED STATES PATENTS

| 1,816,236 | 7/1931 | Shuyler | 34—171 |
| 2,346,500 | 4/1944 | Moore | 34—164 |
| 2,665,568 | 1/1954 | Meyer et al. | 34—20 X |
| 2,983,051 | 5/1961 | Zimmerman | 34—164 |
| 3,053,379 | 9/1962 | Roder | 209—367 |
| 3,058,235 | 10/1962 | Morris et al. | 34—164 |

WILLIAM F. O'DEA, *Primary Examiner.*

NORMAN YUDKOFF, *Examiner.*

A. D. HERRMANN, *Assistant Examiner.*